United States Patent [19]
Nozawa et al.

[11] 4,309,915
[45] Jan. 12, 1982

[54] AUTOMOTIVE TRANSMISSION

[75] Inventors: Koji Nozawa, Higashi-kurume; Yukio Mizukoshi, Yokohama; Mitsuo Ikkatai, Oume, all of Japan

[73] Assignee: Nissan Motor Company, Limited, Yokohama, Japan

[21] Appl. No.: 46,369

[22] Filed: Jun. 7, 1979

[30] Foreign Application Priority Data

Jun. 13, 1978 [JP] Japan .................... 53-71637

[51] Int. Cl.³ ............... F16H 3/38; F16H 57/02; F16D 23/06
[52] U.S. Cl. ............................ 74/339; 74/606 R; 192/53 F; 192/DIG. 1
[58] Field of Search ........... 74/339, 400, 405, 606 R; 192/53 E, 53 F, DIG. 1

[56] References Cited

U.S. PATENT DOCUMENTS

| | | | |
|---|---|---|---|
| 1,702,752 | 2/1929 | Tyler | 74/339 X |
| 2,187,967 | 1/1940 | Fawick | 192/53 E X |
| 2,515,270 | 7/1950 | Simpson | 192/53 E |
| 4,108,021 | 8/1978 | MacAfee et al. | 74/606 R |

FOREIGN PATENT DOCUMENTS

| | | |
|---|---|---|
| 864514 | 1/1953 | Fed. Rep. of Germany . |
| 1605923 | 4/1970 | Fed. Rep. of Germany . |
| 2657058 | 7/1977 | Fed. Rep. of Germany . |
| 1252220 | 11/1971 | United Kingdom . |
| 1324765 | 7/1973 | United Kingdom . |

*Primary Examiner*—Allan D. Herrmann
*Attorney, Agent, or Firm*—Lowe, King, Price & Becker

[57] ABSTRACT

The present invention relates to an automotive transmission for an industrial vehicle. The main shaft of the transmission gear is hollow and internally splined to be slidable along and synchronously rotatable with an externally splined input shaft. Upon removal of a snap ring which holds at least two gears and a synchronizer (disposed between the gears) in place on the main shaft and the removal of a lock pin which interconnects the main shaft and the input shaft, the main shaft can be slid toward the clutch allowing the gears and synchronizer to be slipped, one by one, off the end of the main shaft and readily replaced with new units.

10 Claims, 5 Drawing Figures

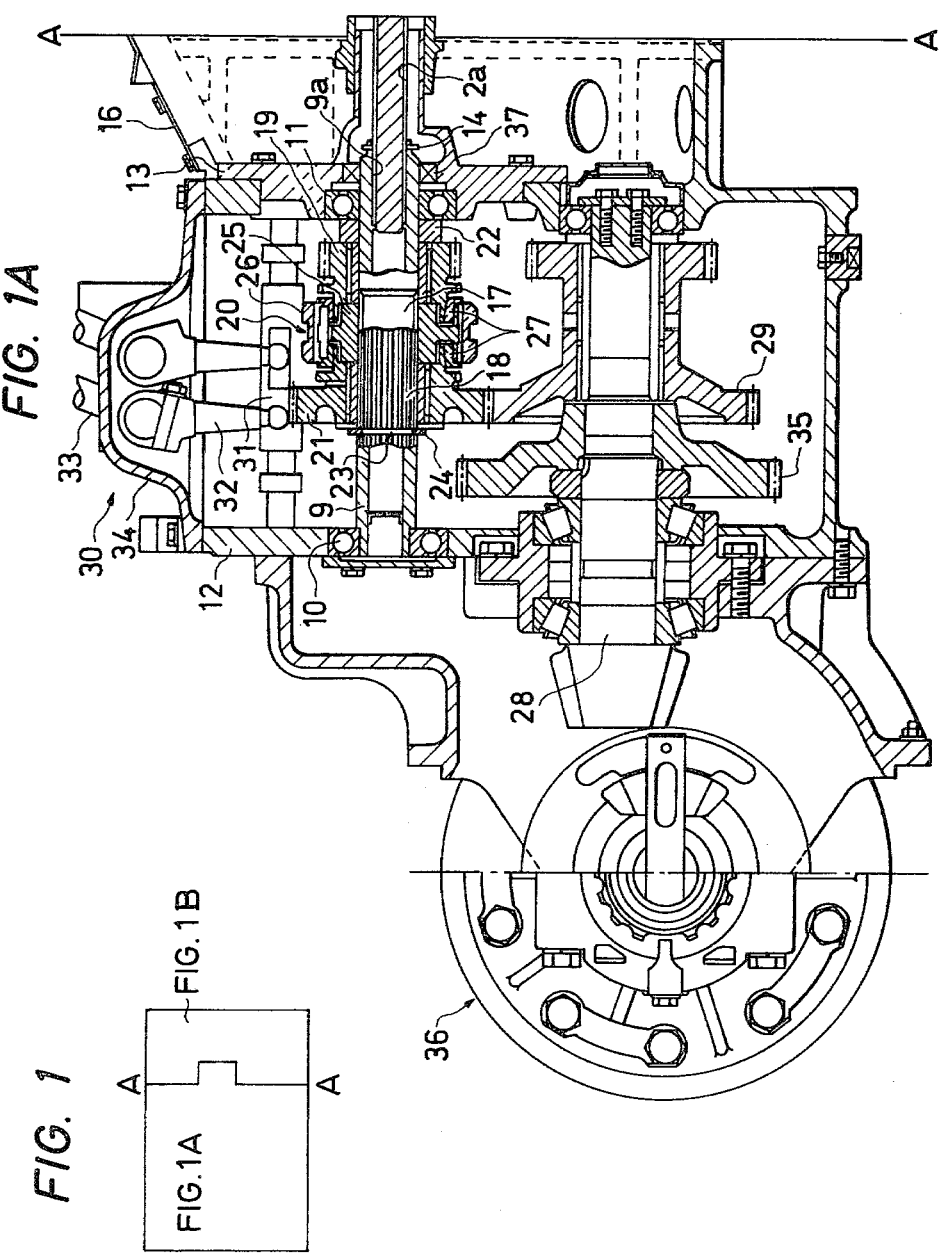

AUTOMOTIVE TRANSMISSION

BACKGROUND OF THE INVENTION

The present invention relates to an industrial vehicle such as a fork lift truck and more particularly to a transmission for said vehicle.

Industrial vehicles perform frequent forward and backward movements due to the nature of their usage so that a clutch mechanism and particularly a synchronizer used in the transmission gear which enables the aforementioned forward and backward movements are subject to rapid wear. Wearing of the synchronizer is notable because when switching between forward and reverse directions the relative speed between the cone clutch portions of the synchronizer are very high due to the fact that the forward gear and the reverse gear rotate in mutually reverse directions.

In conventional transmissions used in industrial vehicles the forward gear, the synchronizer and the reverse gear are assembled together on the main shaft. Therefore when one of the just mentioned components needs to be replaced, at least one of the forward gear, synchronizer and reverse gear needs to be removed from the main shaft. This entails the removal of the main shaft from the transmission unit enabling the appropriate replacement to be made and the subsequent reassembly of the transmission. However due to the construction of the transmission and vehicle it is necessary in order to facilitate the gear or synchronizer replacement to remove the engine as well as the transmission. The engine and transmission as is well known are very heavy units and require considerable time and effort to remove and reinstall. Hence with prior art transmission excessive labour costs and downtime of the vehicle have occured each time a simple gear replacement has been necessary.

SUMMARY OF THE INVENTION

The present invention has been proposed in order to overcome the above mentioned drawback encountered with the prior art arrangements. In brief the present invention enables rapid and easy replacement of the forward gear, synchronizer and reverse gear via the use of a main shaft which can be slid axially within the transmission so that the gears and synchronizer can be slipped off the end of the main shaft and lifted out of the transmission through a suitable normally closed opening.

More specifically the present invention takes the form of a transmission gear for an automotive vehicle comprising: a transmission input shaft; a main shaft carrying first and second gears and a synchronizer disposed between said gears, said main shaft being axially slidable along and synchronously rotatable with said input shaft, first means connectable with both of said main shaft and said input shaft for a releasably interlocking same together and second means disposed on said main shaft for maintaining said first gear, synchronizer and second gear in a predetermined operative position on said main shaft.

It is therefore an object of the present invention to provide a transmission in which the main shaft thereof is slidable within the transmission gear housing to permit the gears and synchronizer carried thereon to be readily removed and replaced.

BRIEF DESCRIPTION OF THE DRAWINGS

This object along with the features and advantages will become readily apparent as the description of the embodiments of the present invention is made in conjunction with the appended drawings in which:

FIG. 1 is a diagram showing how FIGS. 1A and 1B combine to form a single figure.

FIG. 1A is a sectioned side elevation of a transmission according to the first embodiment of the present invention.

DETAILED DESCRIPTION OF THE PREFERRED EMBODIMENTS

Figure 1B:
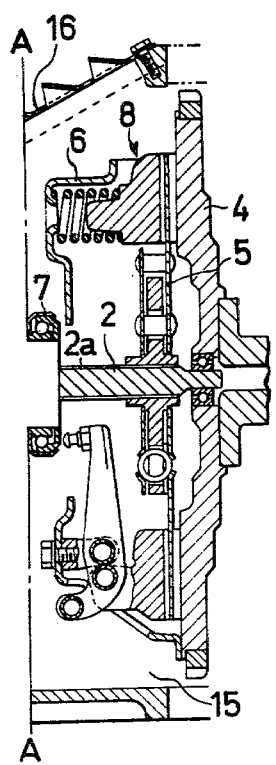
FIG. 1B is a sectional side elevation of a clutch mechanism operatively associated with the transmission depicted in FIG. 1A.

FIGS. 1A and 1B of the drawings depict in side elevation a transmission and clutch mechanism of an industrial vehicle which by way of example is a fork lift truck.

The numeral 2 indicates a clutch shaft or input shaft of the transmission which is coupled with a fly wheel 4 in drive connection with the crank shaft or output shaft (no numeral) of the engine (not shown). The numeral 7 indicates a clutch release bearing. The transmission input shaft 2 is formed with splines 2a. A hollow main shaft 9 is formed with internal splines 9a and slidably disposed on the input shaft 2 in splined connection therewith. The main shaft 9 is in the illustrated position journaled in bearings 10 and 11 respectively disposed in the transmission gear case 12 and the front cover 13 of the case respectively. It will be understood that with this arrangement the main shaft 9 may be slid to the right as seen in FIG. 1A. Thus a lock pin denoted by the numeral 14 is inserted through the two shafts to maintain the relative position therebetween. This pin can be manually withdrawn after removing the upper cover 16 of the clutch (generally denoted by the numeral 8).

An annular recess 17 is formed in the external surface of the main shaft 9 substanially midway between the ends thereof. The portion of the main shaft defined between the first end normally journaled in bearing 10 and the recess 17 is formed with splines 18 while the other portion between the second end normally journaled in the bearing 11 and the recess 17 is left smooth. The reason for this is to allow the main shaft to slide through the bearing 11. The feature will become more clearly appreciated upon consideration of FIG. 2 later in the disclosure.

A forward gear 19, a synchronizer 20 and a reverse gear 21 are disposed on the main shaft 9. The positions of the gears and the synchronizer, disposed therebetween, on the main shaft are maintained via a spacer 22 disposed between the forward gear 19 and the bearing 11 and a snap ring 24 engageable in an annular groove 23. As shown the groove 23 is formed so as to be immediately adjacent the end of the reverse gear 21. With this arrangement the gears are prevented from moving along the main shaft 9 during operation of the vehicle.

The synchronizer 20 used in the present embodiment takes the form of a Warner type synchronizer having a synchronizer hub 20 which in the illustrated position is splined to the main shaft 9 via splines 18 and internal splines formed on the hub. As is well known in the art this type of synchronizer has baulk rings 27, 27 and coupling sleeve 26 which cooperate to match the speed of the gear under selection and subsequently lock same to the shaft on which the gear is mounted.

The forward gear 9 and the reverse gear 21 are mounted on the main shaft 9 via bearings which permit their rotation on the shaft. The reverse gear 21 is shown in meshing engagement with an idler gear 29 mounted on a drive pinion shaft 28. However for clarity of the remaining well known gears such as low and second gears are not illustrated. A shifting arrangement, generally denoted by the numeral 30, includes a shift fork 31, a shifter 32 and a control lever 33 for moving the synchronizer 20. As shown the shifter 23 is mounted on a removable case cover 34. The numerals 35 and 36 respectively indicate a reduction gear of the transmission and a differential gear.

Since the construction of the clutch and transmission is, with the exception of the main shaft construction, well known no explanation as to the normal operation of same will be given.

Figure 2:
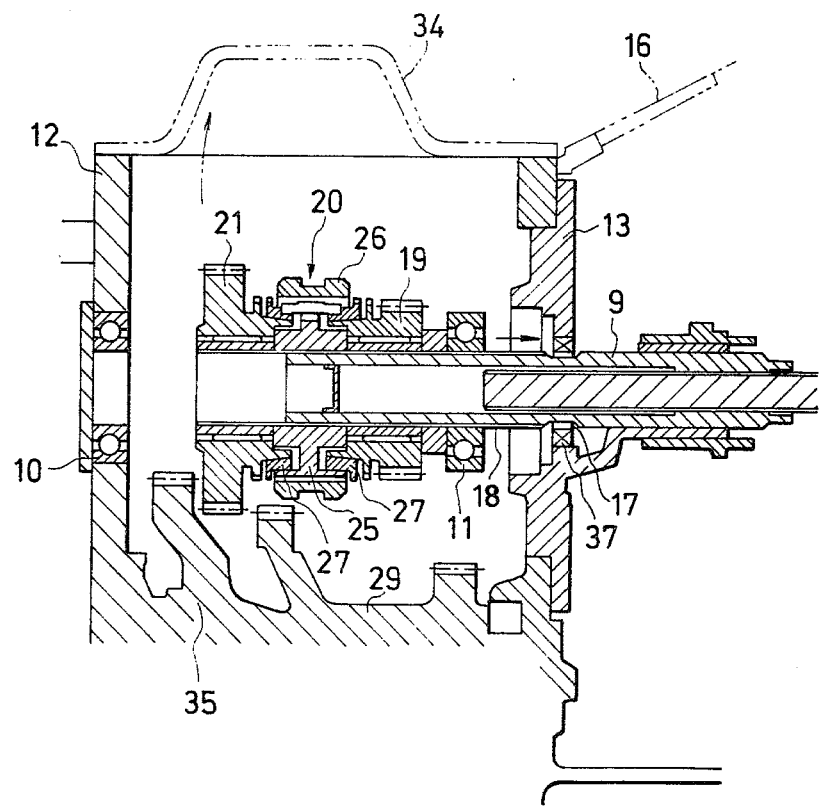
FIG. 2 is a view similar to that of FIG. 1A and which shows the main shaft in a position in which removal and replacement of the gears or synchronizer carried thereon, is possible.

Let us now turn to FIG. 2 which clearly illustrates the main shaft 9 in a position which enables the gears and synchronizer to be removed from the transmission.

In this figure the case cover 34 and the upper clutch cover 16 of the clutch case 15 have been removed from their normal positions which are indicated in phantom. The pin 14 and the snap ring 24 have been removed and the main shaft slid to the illustrated position. Hence under these conditions the reverse gear 21, synchronizer 20 and the forward gear 19 can be, in FIG. 1, synchronized with the end of the main shaft and lifted out of the transmission case. Thus in case it is necessary to replace the synchronizer due to excessive wear between the friction faces it is only necessary to slide the reverse gear 21 and the synchronizer 20 off the main shaft 9 and subsequently slide a new synchronizer and the original reverse gear back onto the main shaft. The operation of replacing the synchronizer is completed by inserting the lock pin 14 and the snap ring 24 back into the appropriate positions.

It will be noted that an oil seal 37 is disposed between the transmission case and the clutch housing 15 for preventing the leakage of oil from the transmission case into the clutch housing 15 and onto the clutch 8. Thus, in order to prevent damage to the seal 37 same to limit the movement of the main shaft toward the clutch 8 to the degree that the splines 18 do not reach said seal and damage same.

Figure 3:
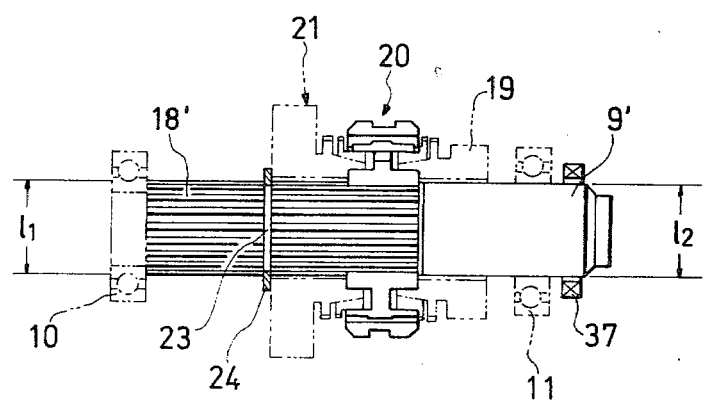
FIG. 3 shows a main shaft of the transmission according to a second embodiment of the present invention.

Looking now to FIG. 3 we find a second embodiment of the present invention which is directed to solving the above mentioned oil seal damage problem. In this second embodiment the diameter of the splined section $l_1$ of the main shaft 9 is made smaller than the diameter $l_2$ of the smooth section. This of course provides a clearance between the splines and oil seal should the main shaft be slid far enough toward the clutch 8 thus reducing the risk of damage to the seal. Further this arrangement allows the omission of the annular recess 17, which in the first embodiment serves to indicate the limit to which the main shaft can be moved toward the clutch during the exchange operation.

Of course the lock pin 14 and the snap ring 24 can be replaced with any other suitable arrangement should the need arise.

Thus it will be clear from the foregoing that the present invention permits very easy and quick replacement of the gears and synchronizer carried on the main shaft without the need of removing the transmission and possibly the engine from the vehicle. Hence the unduly long downtime experienced with prior art arrangements is reduced to minimum. A notable increase in operating efficiency can thus be realized.

What is claimed is:

1. A transmission gear for an automotive vehicle comprising: a transmission input shaft; a main shaft carrying first and second gears and a synchronizer disposed between said gears, said main shaft being axially slidable along and synchronously rotatable with said input shaft; first means connectable with both of said main shaft and input shaft for releasably interlocking the main and input shafts together, said first means including a lock pin passing through said main and input shafts; and second means disposed on said main shaft for maintaining said first gear, synchronizer, and second gear in a predetermined operative position on said main shaft.

2. A transmission gear for an automotive vehicle, comprising: a transmission input shaft; a main shaft carrying first and second gears and a synchronizer disposed between said gears, said main shaft being axially slidable along the synchronously rotatable with said input shaft; first means connectable with both of said main shaft and input shaft for releasably interlocking the main input shafts together; and second means disposed on said main shaft for maintaining said first gear, synchronizer and second gear in a predetermined operative position on said main shaft, said second means including a snap ring engaging an annular groove formed in the main shaft.

3. A transmission gear for an automotive vehicle comprising: a transmission input shaft; a main shaft carrying first and second gears and a synchronizer disposed between said gears, said main shaft being axially slidable along and synchronously rotatable with said input shaft; first means connectable with both of said main shaft and said input shaft for releasably interlocking same together; second means disposed on said main shaft for maintaining said first gear, synchronizer and second gear in a predetermined operative position on said main shaft; a transmission housing substantially enclosing said input shaft, main shaft, first gear, second gear, and synchronizer; and a cover enclosing a portion of said transmission housing adjacent the first and second gears, removal of said cover, first means and said second means enabling said main shaft to slide along said input shaft for successive removal and replacement of said first gear, second gear, and synchronizer from the main shaft.

4. A transmission as claimed in claim 3 or 1 or 2, wherein said main shaft is formed with splines at one end portion thereof.

5. A transmission as claimed in claim 4, wherein said main shaft is formed with an annular recess between the ends thereof and immediately adjacent the inboard end of said splines.

6. A transmission as claimed in claim 4, wherein the diameter of the end portion on which the splines are formed is smaller that the diameter of the remainder of said main shaft.

7. In a vehicular transmission the combination comprising
a clutch housing;

a clutch disposed in said clutch housing;

a transmission housing attached to said clutch housing;

a transmission input shaft leading from said clutch toward said transmission housing;

a hollow main shaft disposed in said transmission housing which receives therein said input shaft, said main shaft and said input shaft being adapted for synchronous rotation and so that said main shaft can be slid along said input shaft toward said clutch;

a lock pin releasably interconnecting said main shaft and said input shaft;

a first gear rotatably mounted on said main shaft;

a second rotatably mounted on said main shaft; a synchronizer attached to said main shaft for synchronous rotation therewith and disposed between said first and second gears;

a fastener disposed on said main shaft for holding said first gear, second gear and said synchronizer in place on said main shaft; and a cover enclosing a portion of said transmission housing adjacent said first and second gears so that upon removal of said cover, said lock pin and said fastener, said main shaft can be slid along said input shaft and said first gear, second gear and synchronizer, successively removed from said main shaft and selectively replaced.

8. The transmission as defined in claim 7, further comprising an oil seal interposed between said transmission housing and said clutch housing and normally sealing said main shaft.

9. A transmission as defined in claim 8, wherein said main shaft is formed with an annular recess which is adapted to juxtapose said oil seal when said main shaft is slid toward said clutch for replacement of gears and synchronizer.

10. A transmission as defined in claim 8, wherein said main shaft is formed with splines for mounting said synchronizer and one of said gears, said splines having a diameter less than that portion of the main shaft normally contacted by said oil seal so that upon said main shaft being slid toward said clutch for removal of said gears and synchronizer, said splines do not damage said oil seal.

* * * * *